(12) United States Patent
Kang

(10) Patent No.: US 7,406,318 B2
(45) Date of Patent: Jul. 29, 2008

(54) APPARATUS AND METHOD FOR POSITIONING MOBILE STATION

(75) Inventor: Byung-Han Kang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 245 days.

(21) Appl. No.: 10/967,521

(22) Filed: Oct. 18, 2004

(65) Prior Publication Data

US 2005/0136938 A1 Jun. 23, 2005

(30) Foreign Application Priority Data

Dec. 17, 2003 (KR) ............... 10-2003-0092461

(51) Int. Cl.
*H04Q 7/20* (2006.01)
(52) U.S. Cl. ............. 455/452.2; 455/456.1; 455/456.2; 455/456.3; 455/456.4; 455/456.5; 455/456.6
(58) Field of Classification Search ............... 455/452, 455/456.1–456.6, 452.2
See application file for complete search history.

(56) References Cited

U.S. PATENT DOCUMENTS

| | | | | |
|---|---|---|---|---|
| 2002/0102994 A1* | 8/2002 | Tuutijarvi | ............ | 455/456 |
| 2002/0110096 A1* | 8/2002 | Carlsson et al. | ............ | 370/328 |
| 2004/0180645 A1* | 9/2004 | Bussan et al. | ............ | 455/404.2 |
| 2004/0203912 A1* | 10/2004 | Budka et al. | ............ | 455/456.1 |
| 2004/0259566 A1* | 12/2004 | Maanoja et al. | ............ | 455/456.1 |
| 2005/0079870 A1* | 4/2005 | Rick et al. | ............ | 455/437 |
| 2005/0208951 A1* | 9/2005 | Annunziato et al. | ............ | 455/456.1 |

* cited by examiner

*Primary Examiner*—Duc Nguyen
*Assistant Examiner*—Eric Elcenko
(74) *Attorney, Agent, or Firm*—The Farrell Law Firm, PC

(57) ABSTRACT

An apparatus and a method for calculating an enhanced observed time difference from a mobile station and transmitting the enhanced observed time difference to a servicing mobile location center for a location-based service are provided. The apparatus comprises means for receiving a location-measuring request and assistance data from the servicing mobile location center; means for choosing a base transceiver station, the synchronization channel of which is to be measured, based on response time detected from the location-measuring request and a predetermined priority; and means for calculating an enhanced observed time difference for the chosen base transceiver station and transmitting a location-measuring response, including the calculation result, to the servicing mobile location center. A first priority is assigned to an overlap between a channel list included in the assistance data and a list of a number of nearby cells and a second priority is assigned to a broadcast control channel allocation list except the channel list included in the assistance data and the list of nearby cells.

8 Claims, 4 Drawing Sheets

APPARATUS AND METHOD FOR POSITIONING MOBILE STATION

PRIORITY

This application claims priority to an application entitled "An Apparatus And A Method For Positioning A Mobile Station" filed with the Korean Intellectual Property Office on Dec. 17, 2003 and assigned Serial No. 2003-92461, the contents of which are incorporated herein by reference.

BACKGROUND OF THE INVENTION

1. Field of the Invention

The present invention relates to an apparatus and a method for positioning a mobile station in an LBS (location-based service) system, and more particularly to an apparatus and a method for calculating an E-OTD (enhanced observed time difference) and transmitting the E-OTD to a SMLC (serving mobile location center) using a mobile station.

2. Description of the Related Art

Positioning technologies used in an LBS include a network-based positioning method, a handset-based positioning method, and a hybrid positioning method which alleviate the defects of the first two methods.

The handset-based positioning method includes a TOA (time of arrival) method using a GPS (global positioning system), an E-OTD method wherein three or more BTSs (base transceiver stations) send radio waves to a mobile station and measure the returning time of the radio waves to provide positional information.

Recently, there is an increasing demand for a mobile station positioning service not only for personal purposes, but also to provide against various disasters and accidents.

FIG. 1 is a diagram illustrating the concept of the E-OTD method, among various positioning technologies for an LBS An MS (mobile station) 100 receives a signal over a SCH (synchronization channel) from nearby BTSs (only one of them is indicated as 210 in the drawing) and measures the distance to the BTSs. An LMU (location measurement unit) 290 measures BCCHs (broadcast control channels) from nearby BTSs in a fixed location. An SMLC 270 calculates the location of the MS 100 based on the measurements transmitted from the MS 100 and the LMU 290.

For an MS to receive an SCH from a BTS, the MS needs to receive system information from a BCCH and obtain a BA (BCCH allocation) list.

As described in the GSM (global system for mobile communication) specification, an MS performs cell management using BA list information contained in system information 2 (2bis, 2ter), which is received in an idle mode, and in system information 5 (5bis, 5ter), which is received in a dedicated mode, among system information which is relayed through a BCCH in an RPLMN (registered public land mobile network) to which a serving cell, in which the MS is presently located, belongs. The BCCH is a channel which transmits system parameters, including information on operators, identifiers, locations of cells, movements of cells, frequencies, and the like.

The system information 2 is a nearby cell description used in an idle mode. The nearby cell refers to a cell the synchronization of which is obtained by an MS, among multiple cells belonging to a BA list. The nearby cell description refers to BCCH frequencies used by cells near a serving cell which is in a camp-on state. The "camp-on state" is a state where a calling party can wait for the answer from the called subscriber. Accordingly, this is called a BA list.

However, if locations of nearby BTSs, which are enumerated in the BA list, are difficult to calculate for geographical reasons, accuracy can deteriorate even when SCHs of the BTSs are received.

According to the 3GPP ($3^{rd}$ Generation Partnership Project) specification, the SMLC is adapted to load information on nearby BTSs, whose locations are convenient to calculate for geographical reasons, into assistance data and transmit it, so that the MS can decode the SCH.

Although the assistance data includes various information related to synchronization (for example, information on channel or timing of BTSs), it does not include the signal intensity of the SCH. This is because the signal intensity of the SCH sent by a BTS is changed in accordance with the location of an MS.

Referring to the GSM specification 3GPP TS 04.31 v8.8.0 (2002-02), the assistance data includes: number of BTSs (0-15); BCCH carrier (channel number); BSIC (base station identity code) of BTS; multi-frame offset from reference BTS; time slot scheme; approximate RTD (real time difference) between reference BTS; E-OTD (expected OTD); uncertainty of E-OTD value; and other information. The E-OTD refers to an OTD which is expected between the reference BTS.

FIG. 2 is a flow chart illustrating a method wherein a conventional mobile station measures its location using assistance data.

In step 2a, a location-measuring request is received through an RRLP. The location-measuring request is created by an SMLC and is transmitted by a BTS. A response time value, which is defined as 2 seconds, 4 seconds, 8 seconds, and the like, according to the specification, is included in the location-measuring request. The mobile station is supposed to send a location-measuring response within the response time.

In step 2b, assistance data through the RRLP is received and information related to the timing of a BTS is detected from the assistance data. The timing information of a BTS includes multi-frame offset, an E-OTD (expected OTD), and the like.

In step 2c, a BTS, the SCH of which is to be measured, is determined based on the response time value. If a BTS can measure an SCH and send a response within a limited time, that BTS is chosen. This can be done by detecting multi-frame offset, which tells the location of the SCH.

In step 2d, the SCH of the chosen BTS is received.

In steps 2e and 2f, the E-OTD value of each of the BTSs relative to a reference BTS is calculated based on information included in the received SCH, and a response, including the calculated value, is transmitted to the SMLC through the RRLP.

In step 2g, if assistance data is not received during step 2b, a BTS which is enumerated in a BA list is chosen and step 2d is performed.

Meanwhile, frequency numbers of the BCCHs from respective BTSs are defined in the assistance data and a few of them are chosen to receive the SCH. This choice is made by service providers according to their own algorithms. If the choice is inappropriate, the accuracy of the calculated value of the E-OTD may be degraded. A specific example could be given as follows:

Assume that seven out of fifteen BTSs are chosen. One of the chosen BTSs has very weak signal intensity, while the remaining eight BTSs, which are not chosen, each have a signal intensity which is relatively stronger than the one BTS. Under this assumption, when an MS fails to receive an SCH from a BTS due to weak signal intensity, it cannot receive an SCH from another BTS because the time has expired. Accordingly, the choice of a BTS can play a role in determining the accuracy of the E-OTD value.

Furthermore, there is no method for obtaining a receipt gain for BTSs which are not defined in the BA list, although their BCH frequency numbers are defined in the assistance data. In that case, receipt gains which have been measured periodically should be used. This decreases the possibility of receiving SCHs and degrades the accuracy in calculating locations.

SUMMARY OF THE INVENTION

Accordingly, the present invention has been made to solve the above-mentioned problems occurring in the prior art, and an object of the present invention is to provide an apparatus and a method to accurately calculate the location of mobile stations, which uses assistance data, by receiving synchronization channels more efficiently.

In order to accomplish this object, there is provided an apparatus for calculating an enhanced observed time difference from a mobile station and transmitting the enhanced observed time difference to a servicing mobile location center for a location-based service, comprising: means for receiving a location-measuring request and assistance data from the servicing mobile location center; means for choosing a base transceiver station, the synchronization channel of which is to be measured, based on response time detected from the location-measuring request and a predetermined priority; and means for calculating an enhanced observed time difference for the chosen base transceiver station and transmitting a location-measuring response, including the calculation result, to the servicing mobile location center, wherein a first priority is assigned to an overlap between a channel list included in the assistance data and a list of a number of nearby cells, and a second priority is assigned to a broadcast control channel allocation list except the channel list included in the assistance data and the list of nearby cells.

In accordance with another aspect of the present invention, there is provided a method for calculating an enhanced observed time difference from a mobile station and transmitting the enhanced observed time difference to a servicing mobile location center for a location-based service, comprising the steps of: receiving a location-measuring request and assistance data from the servicing mobile location center via a radio resource link protocol; choosing a base transceiver station, the synchronization channel of which can be measured, based on response time detected from the location-measuring request and predetermined priority; and receiving the synchronization channel of the chosen base transceiver station, calculating an enhanced observed time difference for the chosen base transceiver station, and transmitting a location-measuring response, including the calculation result, to the servicing mobile location center via the radio resource link protocol, wherein a first priority is assigned to an overlap between a channel list included in the assistance data and a list of a number of nearby cells, and a second priority is assigned to a broadcast control channel allocation list.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, particulars such as exemplary response time are given only to help the general understanding of the present invention and it will be obvious to those skilled in the art that the present invention can be realized without such particulars. A detailed description of known functions and configurations incorporated herein will be omitted when it may make the subject matter of the present invention unclear.

Figure 1:
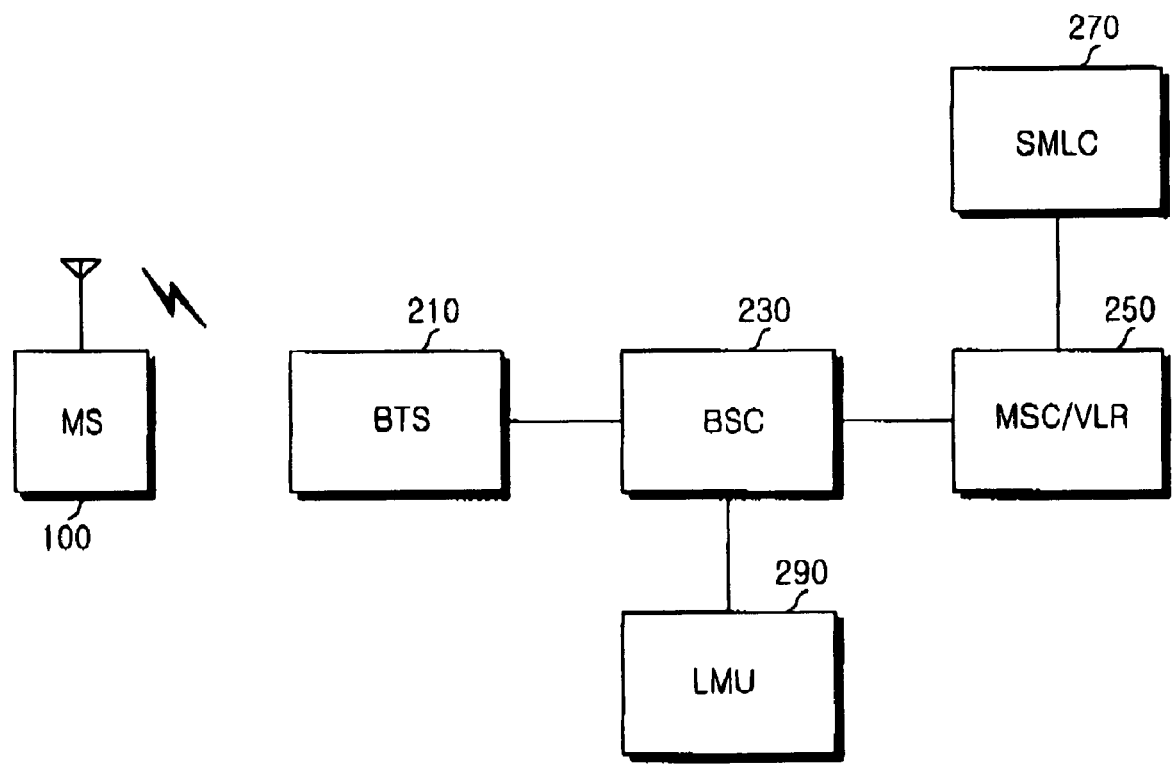
FIG. 1 is a diagram illustrating the concept of an E-OTD method, among various positioning technologies for an LBS.
Figure 2:
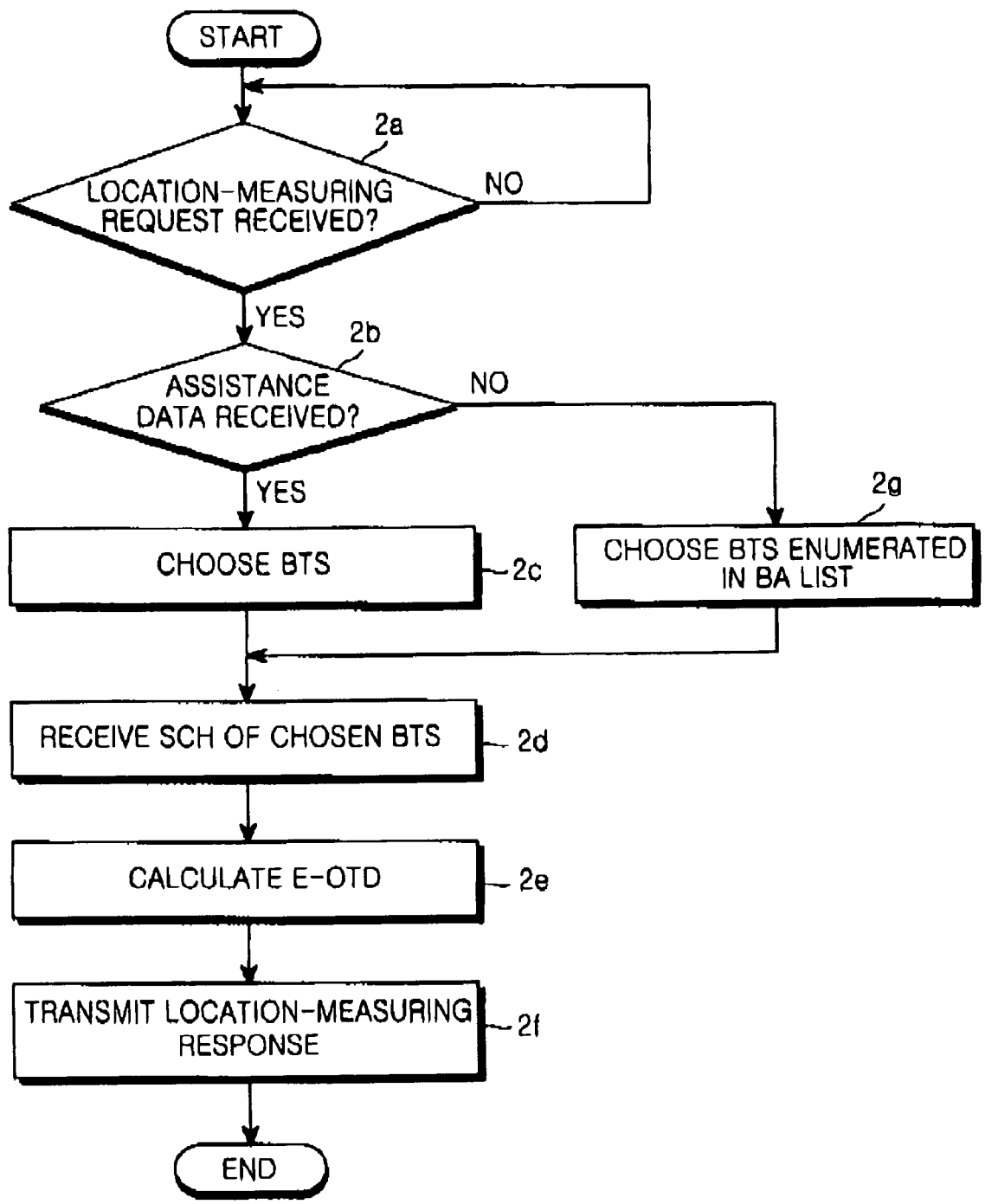
FIG. 2 is a flow chart illustrating a method wherein a conventional mobile station measures its location using assistance data.
Figure 3:
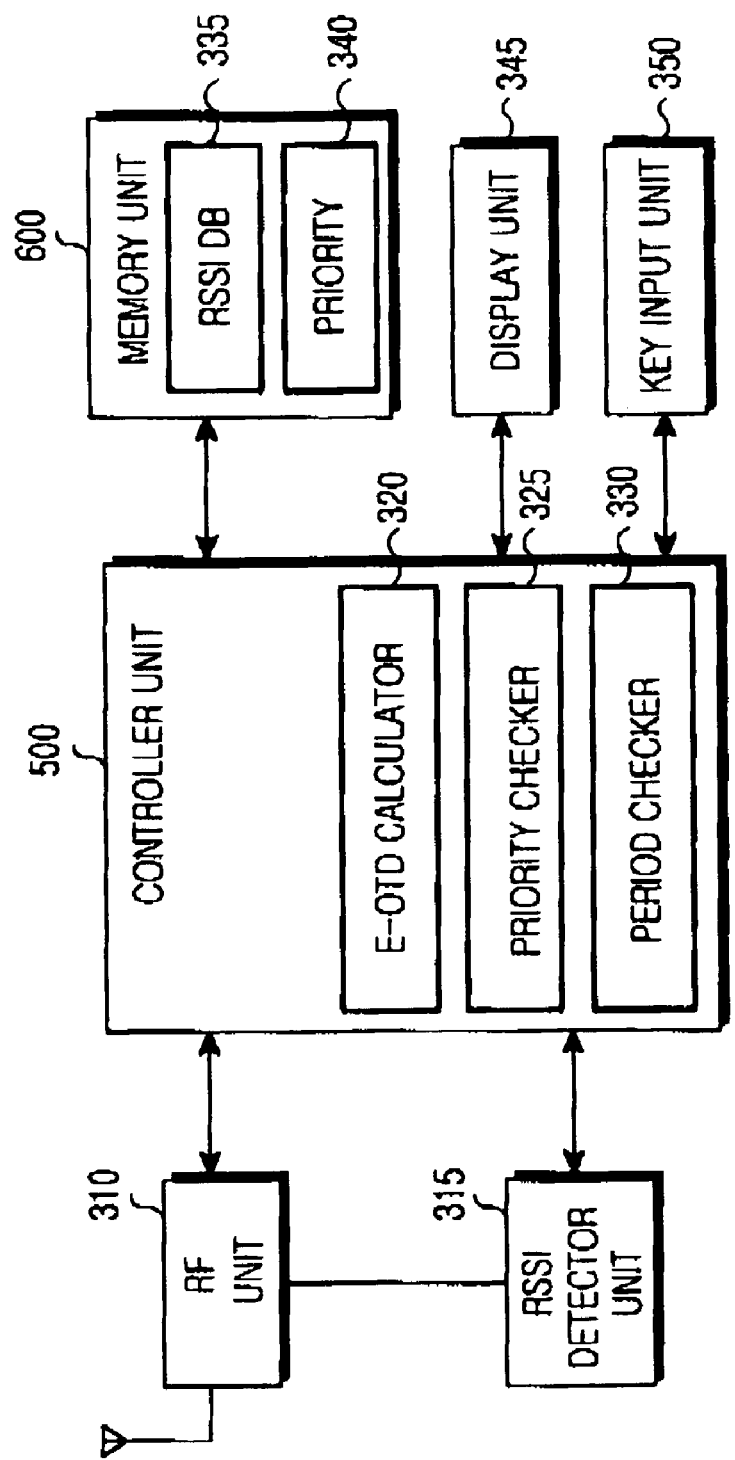
FIG. 3 is a diagram illustrating the construction of a mobile station adapted to measure its location using assistance data according to a preferred embodiment of the present invention.

FIG. 3 is a diagram illustrating the construction of a mobile station adapted to measure its location using assistance data according to a preferred embodiment of the present invention.

In the drawing, particulars which are generally known in the art and correspond only to a mobile station's own function (for example, a voice coder or a voice recognition unit under an assumption that the mobile station is a portable telephone) are omitted and components necessary for location-measuring according to an embodiment of the present invention are illustrated.

A RF(Radio Frequency) unit 310 receives radio signals from a BTS. A detector unit 315 detects the intensity of received signals whenever a predetermined period has arrived. A memory unit 600 includes a first memory unit 335 for storing the intensity of received signals detected by the detector unit 315 and a second memory unit 340 for storing priority. A controller unit 500 includes an E-OTD calculator 320, a priority checker 325, and a period checker 330. The period checker 330 checks if the predetermined period has arrived. When a location-measuring request and assistance data are received from an SMLC, a BTS, the SCH of which is to be measured, is chosen based on the response time detected from the location-requesting request and the priority checked by the priority checker 325. The E-OTD calculator 320 then calculates an E-OTD for the chosen BTS and transmit a location-measuring response via the RF unit 310 to the SMLC. A display unit 345 displays data or status necessary for positioning mobile stations. A key input unit 350 is provided as a user interface means for inputting user commands or data necessary for positioning mobile stations.

Figure 4:
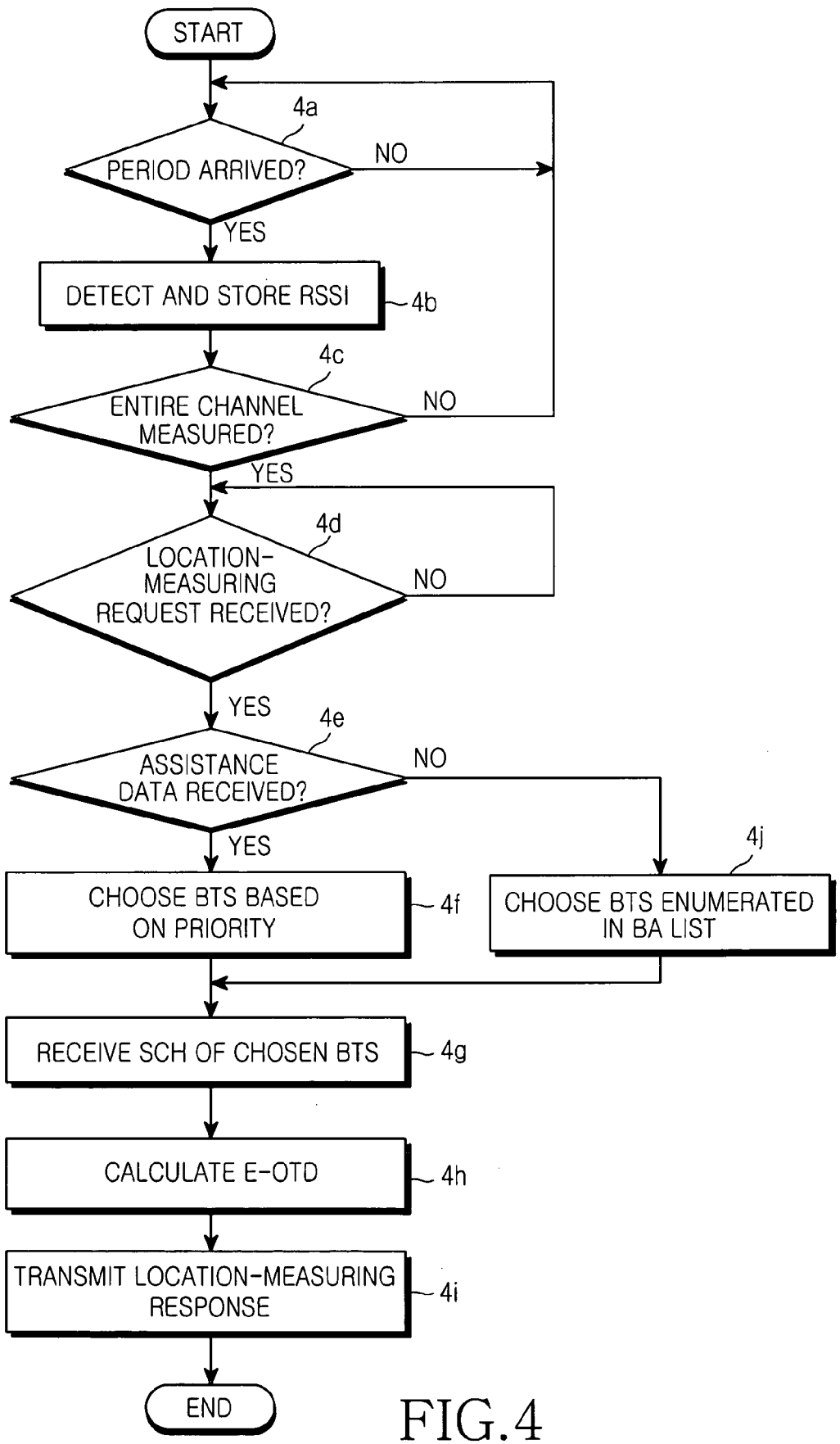
FIG. 4 is a flow chart illustrating a method wherein a mobile station measures its location using assistance data according to a preferred embodiment of the present invention.

FIG. 4 is a flow chart illustrating a method wherein a mobile station measures its location using assistance data according to a preferred embodiment of the present invention.

In steps 4a, 4b, and 4c, before camping on a network, the signal intensity of channels is periodically detected. That is, a database of signal intensity for the entire channel is made by repeatedly checking if a detection period has arrived and detecting the signal intensity of the channel whenever the detection period has arrived. As used herein, the "entire channel" refers to a set of channels including channel no. 1 to channel no. 124 (total number of 124) in the case of a GSM. This range of numbers is commonly referred to as an ARFCN (absolute radio frequency channel number) in the GSM. In the case of a DCS (digital cellular system), the range of numbers is from no. 512 to no. 885 (total number of 374).

In step 4*d*, a location-measuring request is received via an RRLP.

In step 4*e*, assistance data is received via the RRLP, and information on the timing of a BTS is detected from the assistance data.

In step 4*f*, a BTS, the SCH of which is to be measured, is selected based on response time detected from the location-measuring request and a priority. The priority is given as [1]→[2]→[3] and defined as follows:

[1] an overlap between a channel list included in the assistance data and a list of six nearby cells;

[2] a BA list excepting the channel list included in the assistance data and the list of nearby cells; and

[3] a cell the signal intensity of which is strongest among remaining BTSs.

In general, the BTSs belonging to priority level [3] are those the RSSI values of which are not known (that is, the BTSs included in the BTS list in the assistance data but not enumerated in the BA list). The priority for these BTSs is set according to the magnitude of the RSSI using a database made in step 4*b*.

An example of the three priorities will be described under an assumption that, among the assistance data, the channel number of the BTSs and the RSSI are as given below. The channel number refers to a channel number of a BCCH and is indicated as 1(30 Lev): 1 is a channel number and 30 Lev indicates an RSSI. The greater a Lev value is, the stronger the signal intensity.

It is assumed that the RSSI of each of 15 channels is 1:(30 Lev), 2(31 Lev), 3(32 Lev), 4(34 Lev), 5(35 Lev), 6(36 Lev), 7(38 Lev), 8(39 Lev), 9(40 Lev), 10(51 Lev), 11(53 Lev), 12(56 Lev), 13(57 Lev), 14(58 Lev), 15(59 Lev); the channel number of BTSs managed by a nearby cell list is 1, 2, 3, 5, 6, 9; and the channel number of BTSs enumerated in a BA list is 1, 2, 3, 4, 5, 6, 7, 8, 9, 10. Then, the BCCH channel number of BTSs having first priority (corresponding to the above [1]) is 1, 2, 3, 4, 5, 6, 9. The BCCH channel number of BTSs having second priority (corresponding to the above [2]) is 4, 7, 8, 10. In this case, the priority among them can also be set using the RSSI: 10, 8, 7, 4. The BCCH channel number of BTSs having third priority (corresponding to the above [3]) is 11, 12, 13, 14, 15. In this case, the priority among them can also be set using the RSSI: 15, 14, 13, 12, 11.

In step 4*g*, the SCHs of chosen BTSs are received.

In steps 4*h* and 4*i*, the E-OTD value of each of the BTSs relative to a reference BTS is calculated based on information included in the received SCH, and a response, including the calculated value, is transmitted to the SMLC via the RRLP. The calculation of the E-OTD value is performed by a conventional digital signal processor. The response also includes information on a reference BTS and nearby BTSs (cell ID, LAC, BCCH carrier, BSIC, and the like) besides the calculated E-OTD value.

In step 4*j*, if assistance data is not received during step 4*e*, a BTS enumerated in the BA list is selected and step 4*g* is performed.

As mentioned above, during tracking locations based on mobile stations, a BTS, the SCH of which is to be measured, is chosen among BTSs, the BCH frequency number of which is included in assistance data, based on priority. This improves accuracy in calculating the locations of mobile stations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for calculating an enhanced observed time difference from a mobile station and transmitting the enhanced observed time difference to a servicing mobile location center for a location-based service, the apparatus comprising:

means for receiving a location-measuring request and assistance data from the servicing mobile location center;

means for choosing a base transceiver station, the synchronization channel of which is to be measured, based on response time detected from the location-measuring request and a predetermined priority; and means for calculating an enhanced observed time difference for the chosen base transceiver station and transmitting a location-measuring response, including the calculation result, to the servicing mobile location center, wherein said predetermined priority is set to a priority order of: [1] an overlap between a channel list included in the assistance data and a list of a number of nearby cells having a higher priority than [2] a broadcast control channel allocation list excepting the channel list included in the assistance data and the list of nearby cells.

2. An apparatus for calculating an enhanced observed time difference from a mobile station and transmitting the enhanced observed time difference to a servicing mobile location center for a location-based service, the apparatus comprising:

a period checker unit adapted to determine if a predetermined period has arrived;

a detector unit adapted to detect the intensity of received signals whenever the period has arrived for detecting the intensity of received signals for an entire channel;

a first memory for storing a database of the intensity of received signals detected by the detector unit; and a controller unit adapted to choose a base transceiver station, the synchronization channel of which is to be measured, when a location-measuring request and assistance data are received from the servicing mobile location center, based on response time detected from the location-measuring request and a predetermined priority, calculate an enhanced observed time difference for the chosen base transceiver station and transmit a location-measuring response, including the calculation result, to the servicing mobile location center, wherein said priority is set to a priority order of: [1] an overlap between a channel list included in the assistance data and a list of a number of nearby cells, having a higher priority level than [2] a broadcast control channel allocation list excepting the channel list included in the assistance data and the list of nearby cells, having a higher priority level than [3] a cell having the strongest signal intensity among the remaining base transceiver stations.

3. The apparatus as claimed in claim 2, further comprising a second memory for storing said priority.

4. The apparatus as claimed in claim 2, wherein said priority of the base transceiver stations belonging to case [3] follows an order of magnitude of intensity of received signals stored in the first memory.

5. The apparatus as claimed in claim 2, wherein the list of nearby cells is a list of six nearby cells.

6. A method for calculating an enhanced observed time difference from a mobile station and transmitting the enhanced observed time difference to a servicing mobile location center for a location-based service, the method comprising:

receiving a location-measuring request and assistance data from the servicing mobile location center via a radio resource link protocol;

choosing a base transceiver station, the synchronization channel of which is to be measured, based on response time detected from the location-measuring request and a predetermined priority; and receiving the synchronization channel of the chosen base transceiver station, calculating an enhanced observed time difference for the chosen base transceiver station, and transmitting a location-measuring response, including the calculation result, to the servicing mobile location center via the radio resource link protocol, wherein a first priority is assigned to an overlap between a channel list included in the assistance data and a list of a number of nearby cells, and a second priority is assigned to a broadcast control channel allocation list.

7. A method for calculating an enhanced observed time difference from a mobile station and transmitting the enhanced observed time difference to a servicing mobile location center for a location-based service, the method comprising:

determining if a detection period has arrived;

detecting and storing the intensity of received signals for the entire channel when the period has arrived;

receiving a location-measuring request and assistance data via a cordless resource link protocol;

choosing a base transceiver station, the synchronization channel of which can be measured, based on response time detected from the location-measuring request and predetermined priority; and receiving the synchronization channel of the chosen base transceiver station, calculating an enhanced observed time difference for the chosen base transceiver station and transmit a location-measuring response, including the calculation result, to the servicing mobile location center via the radio resource link protocol, wherein a first priority is assigned to an overlap between a channel list included in the assistance data and a list of six nearby cells, a second priority is assigned to a broadcast control channel allocation list, and a third priority is assigned to a channel having the strongest signal intensity stored in the second step.

8. The method as claimed in claim 7, wherein the detection of intensity of received signals is performed before camping on a network.

* * * * *